United States Patent
Takayama et al.

(10) Patent No.: US 9,902,098 B2
(45) Date of Patent: Feb. 27, 2018

(54) METHOD FOR MANUFACTURING VEHICLE SEAT CORE MEMBER AND VEHICLE SEAT CORE MEMBER

(71) Applicant: JSP CORPORATION, Tokyo (JP)

(72) Inventors: Atsuo Takayama, Kanuma (JP); Motoaki Ueguri, Nikko (JP); Keiichi Hashimoto, Utsunomiya (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 15/509,966

(22) PCT Filed: Sep. 15, 2015

(86) PCT No.: PCT/JP2015/004694
§ 371 (c)(1),
(2) Date: Mar. 9, 2017

(87) PCT Pub. No.: WO2016/042759
PCT Pub. Date: Mar. 24, 2016

(65) Prior Publication Data
US 2017/0252952 A1    Sep. 7, 2017

(30) Foreign Application Priority Data
Sep. 16, 2014    (JP) .................... 2014-188146

(51) Int. Cl.
*A47C 7/18*    (2006.01)
*A47C 7/20*    (2006.01)
(Continued)

(52) U.S. Cl.
CPC .......... *B29C 44/1271* (2013.01); *B29C 44/56* (2013.01); *B60N 2/005* (2013.01);
(Continued)

(58) Field of Classification Search
CPC ..... B29C 44/1271; B29C 44/56; B60N 2/005; B60N 2/646; B29K 2705/12; B29K 2023/12; B29L 2031/771
(Continued)

(56) References Cited

U.S. PATENT DOCUMENTS 5,336,708 A * 8/1994 Chen .................... A61C 15/041
                                                        132/321
5,633,286 A * 5/1997 Chen .................... A61C 15/041
                                                        132/321
(Continued)

FOREIGN PATENT DOCUMENTS

CN    1461193 A    12/2003
EP    1792700 A1    6/2007
(Continued)

OTHER PUBLICATIONS

Mar. 30, 2017 International Preliminary Report on Patentablity issued in International Application No. PCT/JP2015/004694.
(Continued)

*Primary Examiner* — Rodney B White
(74) *Attorney, Agent, or Firm* — Oliff PLC

(57) ABSTRACT

A method for manufacturing including securing attachments disposed near both ends in the seat core member front portion made of a molded article of expanded beads, the securing attachments being connected by an embedded connecting member extending in the seat core member longitudinal direction. The securing attachment includes a base embedded in the molded article of expanded beads, an upright frame joined to the base to extend out of the molded article of expanded beads, and a securing portion extending from the upright frame to project away from the molded article of expanded beads. The method includes creating, during or after molding the molded article of expanded beads, a space or notch in an outer side of the securing (Continued)

attachment upright frame of the molded article of expanded beads in the seat core member longitudinal direction, the notch extending toward an outer side in the seat core member longitudinal direction.

8 Claims, 5 Drawing Sheets

(51) Int. Cl.
*B29C 44/12* (2006.01)
*B29C 44/56* (2006.01)
*B60N 2/005* (2006.01)
*B60N 2/64* (2006.01)
*B29K 23/00* (2006.01)
*B29L 31/00* (2006.01)
*B29K 705/12* (2006.01)

(52) U.S. Cl.
CPC .......... *B60N 2/646* (2013.01); *B29K 2023/12* (2013.01); *B29K 2705/12* (2013.01); *B29L 2031/771* (2013.01)

(58) Field of Classification Search
USPC ........................................ 297/452.48, 452.53
See application file for complete search history.

(56) References Cited

U.S. PATENT DOCUMENTS

| | | | | |
|---|---|---|---|---|
| 5,775,779 | A * | 7/1998 | Abu-Isa | A47C 7/282 297/452.56 |
| 8,308,235 | B2 * | 11/2012 | Ellison | B60N 2/7005 297/452.27 X |
| 8,398,166 | B2 * | 3/2013 | Lindsay | B29C 44/0461 297/452.27 X |
| 8,408,655 | B2 * | 4/2013 | Ellison | B60N 2/015 297/452.18 X |
| 8,439,440 | B2 * | 5/2013 | Ellison | B29C 44/0461 297/452.27 X |
| 8,540,318 | B2 * | 9/2013 | Folkert | B60N 2/686 297/452.53 X |
| 8,974,003 | B2 * | 3/2015 | Reedy | B60N 2/68 297/452.38 X |
| 2004/0155512 | A1 | 8/2004 | Nakamura | |
| 2009/0146472 | A1 * | 6/2009 | Galbreath | B60N 2/2887 297/452.48 X |
| 2011/0221254 | A1 * | 9/2011 | Lindsay | B29C 44/0461 297/452.48 X |
| 2012/0049603 | A1 * | 3/2012 | Ellison | B60N 2/015 297/452.48 X |
| 2013/0278025 | A1 * | 10/2013 | Wakabayashi | B62K 19/16 297/195.1 |

FOREIGN PATENT DOCUMENTS

| | | |
|---|---|---|
| JP | S52-061605 U | 5/1977 |
| JP | H03-122929 A | 5/1991 |
| JP | H08-214986 A | 8/1996 |
| JP | 2011-045629 A | 3/2011 |
| JP | 2011-111131 A | 6/2011 |
| JP | 2015-174340 A | 10/2015 |

OTHER PUBLICATIONS

Dec. 8, 2015 Written Opinion issued in Patent Application No. PCT/JP2015/004694.

Dec. 8, 2015 International Search Report issued in Patent Application No. PCT/JP2015/004694.

* cited by examiner

METHOD FOR MANUFACTURING VEHICLE SEAT CORE MEMBER AND VEHICLE SEAT CORE MEMBER

TECHNICAL FIELD

The present invention relates to a method for manufacturing a vehicle seat core member and a vehicle seat core member.

BACKGROUND ART

In recent years, a vehicle seat core member formed by integrating a reinforcing member made of, for example, metal, a securing attachment for securing a seat to a vehicle, and a molded article of expanded beads (hereinafter may be referred to simply as a molded article) has been used for cars.

In such a vehicle seat core member formed by integrating a molded article of expanded beads, a reinforcing member, and other parts, the reinforcing member is embedded in the molded article of expanded beads made of thermoplastic resin. Specifically, the core member is formed by positioning a metal frame integrated with a connecting protrusion serving as a securing attachment in a mold for molding expanded beads, loading expanded beads in the mold, and then performing foam molding (see page 6 and FIG. 3 in Patent Literature 1). In this manner, a vehicle seat core member including a connecting protrusion projecting from the bottom of a molded article of expanded beads and a metal frame of which portion is embedded in the molded article of expanded beads is provided. When using the seat core member, the connecting protrusion, which is the securing attachment, is connected to a stopper of the vehicle to secure the seat to a vehicle.

CITATION LIST

Patent Literature

Patent Literature 1: JP 2011-45629 A

SUMMARY OF INVENTION

Technical Problem

Since a molded article of expanded beads made of thermoplastic resin shrinks after molding, the dimension of the molded article of expanded beads needs to be recovered by a curing step after molding. If a securing attachment and a connecting member are embedded in a molded article of expanded beads that shrinks, the connecting member or the like may be bent by the shrink or the shrink may not be uniform, which causes dimensional errors of the molded article after curing.

In particular, there is such a disadvantage as will be described below for a seat core member including attachments for securing a seat to a vehicle disposed near both ends in the front portion of a seat core member and a connecting member that is embedded in a molded article and extends in the longitudinal direction of the seat with the securing attachments connected to the connecting member. Since the molded article shrinks by a large degree in the longitudinal direction of the seat, the dimensional error of the securing attachments disposed near both ends in the front portion of the seat core member becomes large. This disadvantageously creates misalignment of the securing attachments to attachments of the vehicle, making it difficult to secure the seat.

The present invention is made to solve the aforementioned problem. An object of the present invention is to provide a method for manufacturing with excellent dimensional accuracy a vehicle seat core member including securing attachments integrally molded with a molded article of expanded beads made of thermoplastic resin and the vehicle seat core member.

Solution to Problem

The present invention provides (1) a method for manufacturing by integral molding a vehicle seat core member including securing attachments used for securing a seat to a vehicle and embedded in a molded article of expanded beads made of thermoplastic resin, the securing attachments being disposed near both ends in a front portion of the vehicle seat core member and connected by a connecting member embedded in a front portion of the molded article of expanded beads, the connecting member extending in a longitudinal direction of the seat core member, each of the securing attachments including a base embedded in the molded article of expanded beads, an upright frame joined to the base to extend out of the molded article of expanded beads, and a securing portion extending from the upright frame to project away from the molded article of expanded beads, the method comprising creating, during or after molding the molded article of expanded beads, a space at an outside position from a part of the molded article of expanded beads where the upright frame of the securing attachment is embedded in a longitudinal direction of the seat core member, or a notch at an outside position from the part of the molded article of expanded beads in a longitudinal direction of the seat core member where the upright frame of the securing attachment is embedded toward an outer side in a longitudinal direction of the seat core member, (2) the method for manufacturing a vehicle seat core member according to (1), in which a plate member constitutes an end of the connecting member with the base of the securing attachment joined to the plate member, and a space or a notch is created to extend in a direction intersecting the longitudinal direction of the seat core member, during or after molding the molded article of expanded beads, at an outside position from a part of the molded article of expanded beads where the plate member and the base are embedded, (3) the method for manufacturing a vehicle seat core member according to (1), in which a plate member constitutes an end of the connecting member with the base of the securing attachment joined to the plate member, and a space is created, during or after molding the molded article of expanded beads, at an outside position from a part of the molded article of expanded beads where the plate member is embedded and at a further outer portion than an outer edge of the plate member in the longitudinal direction of the seat core member, (4) the method for manufacturing a vehicle seat core member according to (1), in which the space or the notch is created as deep as one third or more of a depth from a surface of the molded article to the base, (5) the method for manufacturing a vehicle seat core member according to (1), in which the connecting member is a wire having a diameter of 2 mm to 8 mm and a tension strength of 200 N/mm² or higher, (6) the method for manufacturing a vehicle seat core member according to (1), in which a thermoplastic resin forming the molded article of expanded beads includes a crystalline resin, (7) the method for manufacturing a vehicle seat core member according to (1), in which the connecting member has a bent section bent in a thickness direction, and a void cavity is provided, during or after molding the molded article of expanded beads, at an outside position from the bent section in a part of the molded article of expanded beads where the bent section is embedded, the void cavity extending in a thickness direction from a surface of the molded article of expanded beads to the bent section, and (8) a vehicle seat core member integrally molded to embed securing attachments for securing a seat to a vehicle in a molded article of expanded beads made of thermoplastic resin, wherein the securing attachments are disposed near both ends in a front portion of the vehicle seat core member and connected by a connecting member embedded in a front portion of the molded article of expanded beads, the connecting member extending in a longitudinal direction of the seat core member, each of the securing attachments includes a base embedded in the molded article of expanded beads, an upright frame joined to the base to extend out of the molded article of expanded beads, and a securing portion extending from the upright frame to project away from the molded article of expanded beads, and vehicle seat core member is obtained by forming creating, during or after molding the molded article of expanded beads, a space at an outside position from a part of the molded article of expanded beads where the upright frame of the securing attachment is embedded in a longitudinal direction of the seat core member, or a notch at an outside position from the part of the molded article of expanded beads in a longitudinal direction of the seat core member where the upright frame of the securing attachment is embedded toward an outer side in a longitudinal direction of the seat core member.

Advantageous Effects of Invention

The present invention provides a method for manufacturing a vehicle seat core member by integral molding to embed a securing attachment in a molded article of expanded beads. Specifically, during or after molding, a space or a notch that extends from the upright frame toward the outer side in the longitudinal direction of the seat core member is created in an outer portion, in the longitudinal direction of the seat core member, of the molded article of expanded beads where the upright frame of the securing attachment is embedded. The space or the notch prevents a warp or a deformation of the molded article of expanded beads caused by shrink after molding, and thus a vehicle seat core member having an excellent dimensional accuracy can be provided. Moreover, the space or the notch created in a particular place of the molded article improves resistant strength against an impact applied by pulling up the securing attachment. As described above, the present invention reduces dimensional errors of the molded article and improves the resistant strength against the pull-load of the securing attachment embedded in the molded article.

BEST MODE FOR CARRYING OUT THE INVENTION

An embodiment will be described below with reference to the drawings.

Figure 1:
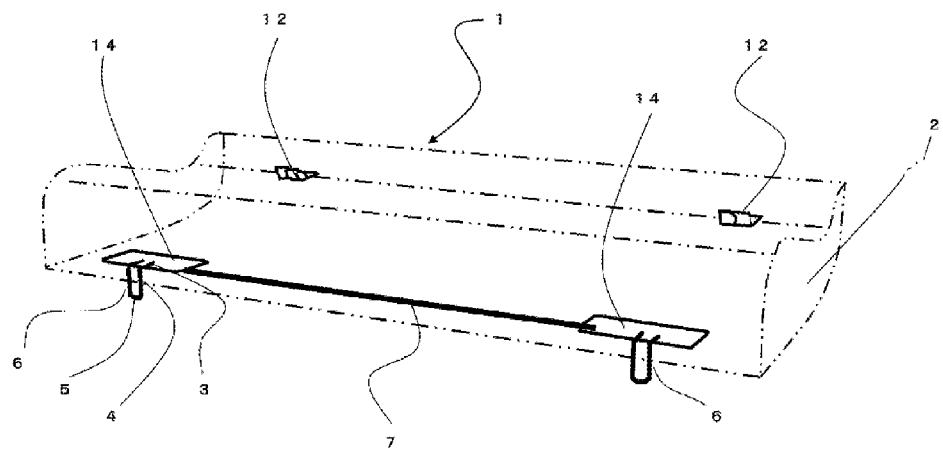
FIG. 1 is a schematic perspective view illustrating an example vehicle seat core member integrally molded with securing attachments that are connected by a connecting member and embedded near both ends in a front portion of the molded article.
Figure 2:
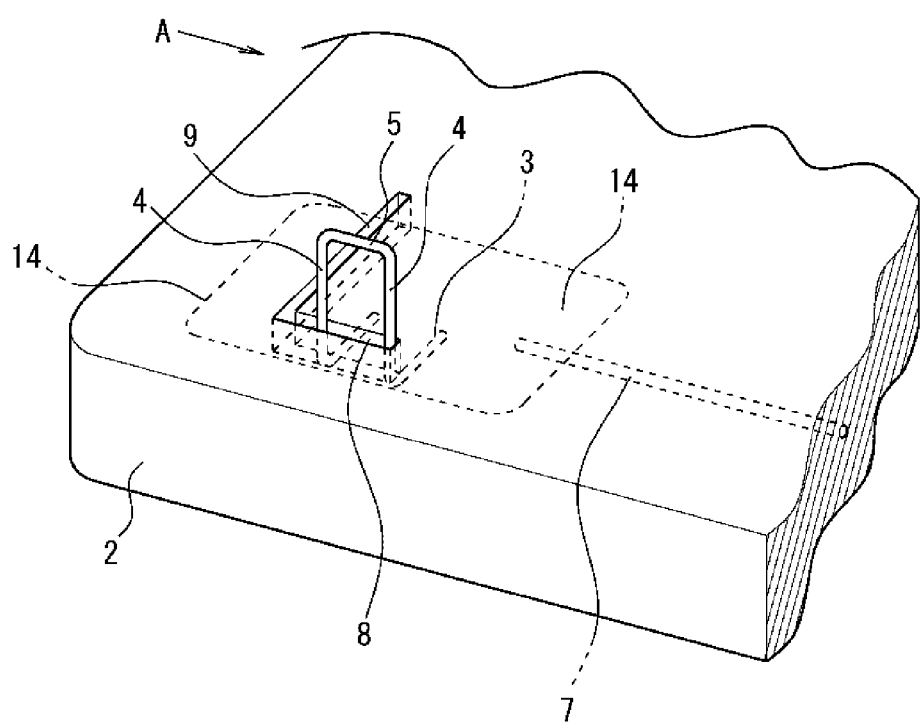
FIG. 2 is an enlarged perspective view of the right portion of the molded article illustrated in FIG. 1 schematically illustrating a portion around the securing attachment in the back side of the seat core member after molding.

FIG. 1 illustrates an example of a vehicle seat core member 1. The seat core member 1 is integrally molded with securing attachments 6 embedded in a molded article of expanded beads made of thermoplastic resin 2. As illustrated in FIG. 2, the securing attachment 6 includes bases 3, upright frames 4, and a securing portion 5. The bases 3 are embedded in the molded article 2. The upright frames 4 connected to the bases 3 extend out of the molded article 2. The securing portion 5 extends from the upright frames 4 to project away from the molded article 2. The securing portion 5 engages with a joint attachment (not shown) to connect the seat to the vehicle.

The securing attachments 6 are disposed at least near both ends in the front portion of the seat core member 1. The securing attachments 6 are connected to the connecting member 7 which is embedded in the front portion of the molded article 2 and extends in the longitudinal direction of the seat core member 1. The securing attachments 6 may be connected directly to the connecting member 7. As illustrated in FIG. 1, the bottom faces of the bases 3 of the securing attachments 6 may be connected to plate members 14 forming ends of the connecting member 7. The seat core member 1 may be provided with fixing attachments 12 or the like as required. When the vehicle seat core member is mounted on a vehicle, the width direction of the vehicle is the longitudinal direction of the seat core member and the vertical direction of the vehicle is the thickness direction of the seat core member. The securing attachment 6 preferably extends out of the lower side of the seat core member when it is mounted on the vehicle.

The molded article 2 is made of a thermoplastic resin, for example, polystyrene resin, polyolefin resin such as polyethylene resin, polypropylene resin, polyester resin such as polybutylene succinate, polyethylene terephthalate, polylactic acid, or polycarbonate resin. A composite resin of polystyrene resin and polyolefin resin and a composite of two or more of the abovementioned resins can also be used. Among these materials, a thermoplastic resin including a crystalline resin such as one of polyolefin resins or a composite of two or more polyolefin resins and a composite resin of polystyrene resin and polyolefin resin are preferably used for the molded article 2. The present invention is more effective for a molded article of expanded beads made of a thermoplastic resin including crystalline resin, which tends to shrink more than a molded article of expanded beads made of non-crystalline resin. The molded article of expanded beads is preferably made of polyethylene resin or polypropylene resin, and particularly preferably made of polypropylene resin.

The expanded beads can be manufactured by a known method for manufacturing such expanded beads. In an example method, resin particles are dispersed in a dispersion medium (usually, water) including a dispersant and a surfactant as required in a pressurizable sealed container, such as an autoclave. A foaming agent is injected in the resin particles in the dispersion medium, and under heating, the foaming agent is impregnated in the resin particles. Foamable resin particles impregnated with the foaming agent are ejected with the dispersion medium from the inside of the container, which is kept under high temperature and high pressure, to a low pressure environment (usually of an ambient pressure) to obtain expanded beads.

The securing attachment 6 is made of, for example, metal, such as iron, aluminum, and copper or resins. Among these materials, a metal, in particular a steel material, is preferable so as the seat core member 1 to have high strength. By welding or bending such materials, the securing attachment 6 can be formed. A wire made of the abovementioned material may preferably be used for the bases 3, the upright frames 4, and the securing portion 5. It is preferable that the securing portion 5 is shaped to be securable to a vehicle. A U-shape is preferable in that the manufacturing process becomes easy. The upright frames 4 and the bases 3 of the securing attachment 6 are joined to form an L-shape. The U-shape securing portion 5 is preferably joined to two upright frames 4.

The same material as the securing attachment 6 is used for the connecting member 7 which is connected to the securing attachments 6. The connecting member 7 is preferably made of a wire but may have any form, such as a line, a pipe, and a bar. A wire having a lower rigidity than conventionally used wires is preferably used for the connecting member 7 to achieve a lighter weight. In such a case, however, the connecting member 7 elastically deforms easily by shrink of the molded article of expanded beads.

The wire is preferably made in a form of a bar or a line and has a diameter of 2 mm to 8 mm. More preferably, the diameter of the wire is 3 mm to 7 mm, further preferably, 3.5 mm to 6 mm. The tension strength of the wire is preferably as high as or above 200 N/mm$^2$. To improve the strength of the seat core member, the tension strength is preferably 250 N/mm$^2$ to 1300 N/mm$^2$. Metal, in particular a steel material, has such a tension strength.

The yield point of the wire is preferably as high as or above 400 N/mm$^2$, more preferably, 440 N/mm$^2$. The property of the wire can be measured based on JIS G 3532.

The seat core member 1 can be made by an example method described below. The securing attachments 6 connected by the connecting member 7 and other necessary attachments are positioned in a mold for molding a seat. The expanded beads are loaded in the mold. Heated steam is introduced in the mold to heat the expanded beads to perform secondary foaming, thereby causing fusion among the expanded beads to form the molded article 2 integrated with the attachments, such as the securing attachments 6. By such a method, a seat core member including the molded article 2 integrated with the securing attachments 6, the connecting member 7, and other attachments is made. The bases 3 and portions of the upright frames 4 of the securing attachment 6 are preferably embedded and fixed in the molded article of expanded beads 2.

Apparent density of the foamed molded article 2 forming the seat core member 1 is preferably 0.015 g/cm$^3$ to 0.3 g/cm$^3$. For the foaming molded article 2 made of polyolefin resin, 0.02 g/cm$^3$ to 0.2 g/cm$^3$ is preferable. The molded article of expanded beads made of polyolefin resin that has a apparent density within the above range provides the seat core member 1 with high strength and high impact resistance. Because the molded article of expanded beads has a preferable elasticity, structural members, such as the securing attachment 6 and the connecting member 7, can firmly be secured. From this point of view, the apparent density of the molded article of expanded beads 2 is preferably 0.025 g/cm$^3$ to 0.1 g/cm$^3$, more preferably, 0.03 g/cm$^3$ to 0.08 g/cm$^3$.

A plurality of foamed molded articles having different apparent densities may be combined to form a single foamed molded article. In such a case, an average of the overall apparent density of the molded article of expanded beads 2 is to be within the above range. The apparent density is obtained by submerging the molded article of expanded beads 2 in water and measuring the increased volume (submerging method).

Figure 5:
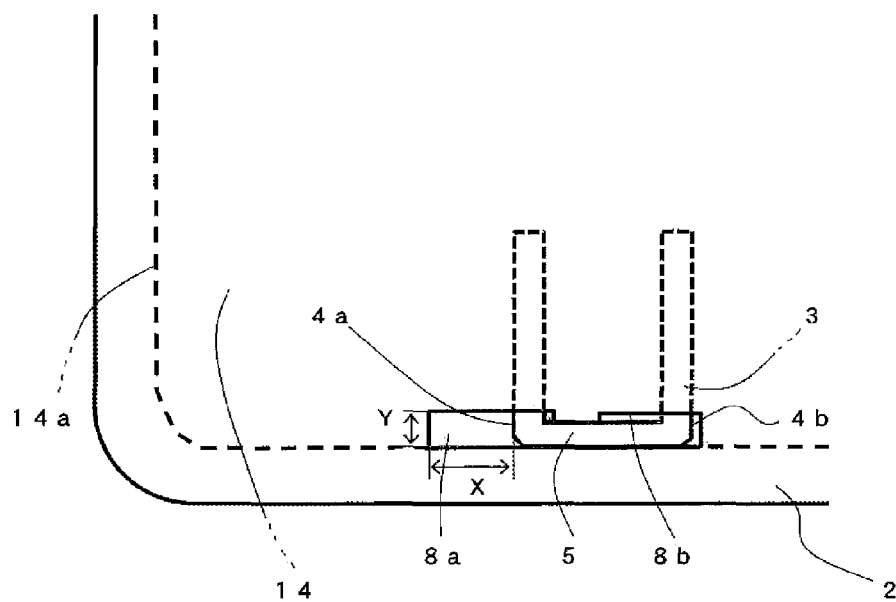
FIG. 5 is a plan view of the back side of the seat core member schematically illustrating a space or a notch created near the securing attachment disposed in the back side of the molded seat core member, where the notch is created in an outer portion, in the longitudinal direction of the seat core member, of the molded article of expanded beads where the upright frame is embedded.

A method for manufacturing the vehicle seat core member according to the present invention is performed as described below. A space or a notch 8 is created in a particular place of a molded article of expanded beads during or after thermally molding the expanded beads loaded in the mold in which the securing attachments 6 and other attachments are positioned. Specifically, as illustrated in FIGS. 2 and 5, a space or a notch 8 is created in a portion of the molded article 2 where the upright frames 4 of each securing attachment 6 is embedded. The space or the notch 8 is created in the outer side of the upright frame 4 in the longitudinal direction of the seat core member (the direction indicated by arrow A in FIG. 2). The notch extends outward from the upright frame in the longitudinal direction of the seat core member. The space or the notch 8 can be created by cutting the molded article 2 with a cutter knife, a heat wire, or other cutting tools. The notch is just a linear cut in the molded article 2 created using a cutter knife, a heat wire, or other cutting tools, but the space has a volume. FIGS. 2 and 5 illustrate an example of the space. FIG. 2 illustrates the molded article 2 that has not yet shrunk after molding. The space or the notch 8 is preferably created near the upright frames 4 or to join the upright frames 4. More preferably, the faces of the upright frames 4 facing an outer side in the longitudinal direction of the seat core member are exposed to the space as illustrated in FIGS. 2 and 5. The space or the notch 8 is preferably created so as its depth direction to be parallel to the upright frames 4. The term "after molding" means a period after the molded article of expanded beads is molded in a mold with the securing attachment embedded therein but before the molded article 2 shrinks by a large degree. Specifically, it is preferable to immediately create the space or the notch while the shrink is within the elastic range of the steel constituting the connecting member and the securing attachment. More specifically, the space or the notch 8 is preferably created within about 60 minutes after molding, usually. The notch is created to extend to the outer side of the upright frame 4 in the longitudinal direction of the seat core member. Since the space has a length in the longitudinal direction of the seat core member, the space is not necessarily created to extend in the longitudinal direction of the seat core member.

Accordingly, in the embodiments, at an outside position from the part of the molded article of expanded beads where the upright frame 4 of the securing attachment is embedded in the longitudinal direction of the seat core member, a space having a length along the longitudinal direction of the seat core member or a notch extending along the longitudinal direction of the seat core member may be formed. If a space extending toward the base and a notch extending in the longitudinal direction of the seat core member are created to overlap with each other at the outside position in the longitudinal direction of the seat core member, this case is included in a case where the space is formed.

The space or the notch 8 may be created not only by cutting using a cutter knife or a heat wire after molding. The space or the notch 8 may be created by molding a molded article of expanded beads using a mold shaped to form the space or the notch 8. The space may have a form of a slit or a groove. Specifically, the space is created by boring or cutting a portion of the molded article 2 in the outer side in the longitudinal direction, of the upright frame 4 or by molding using a mold shaped to form a space. The notch may be created by, for example, creating a cut along the longitudinal direction of the seat core member using a cutter knife or other tools, in a portion of the molded article in the outer side of the upright frame 4 in the longitudinal direction.

In a conventional method, a molded article of expanded beads is obtained by molding the expanded beads in a mold designed to have dimensions taking into account the shrink of the molded article 2 corresponding to a shrinkage ratio of a estimated for the type of the resin that forms the molded article 2. During manufacturing of the molded article of expanded beads by integral molding in which the securing attachments 6 and the connecting member 7 are embedded in the molded article of expanded beads, the shrink causes the dimension of the mold, in particular around the securing attachment 6 and the connecting member 7, to change more than estimated. This disadvantageously results in a large dimensional error of the seat core member. This problem is likely caused by the difference in shrinkage ratio between the molded article of expanded beads and the securing attachment or the connecting member. When the molded article shrinks, only a portion of the molded article moves inward. Shrink of the portion of the molded article around the securing attachment and the connecting member is affected by the securing attachment and the connecting member, causing shrink of the molded article to be ununiform. This is considered a cause of the dimensional error.

Figure 3:
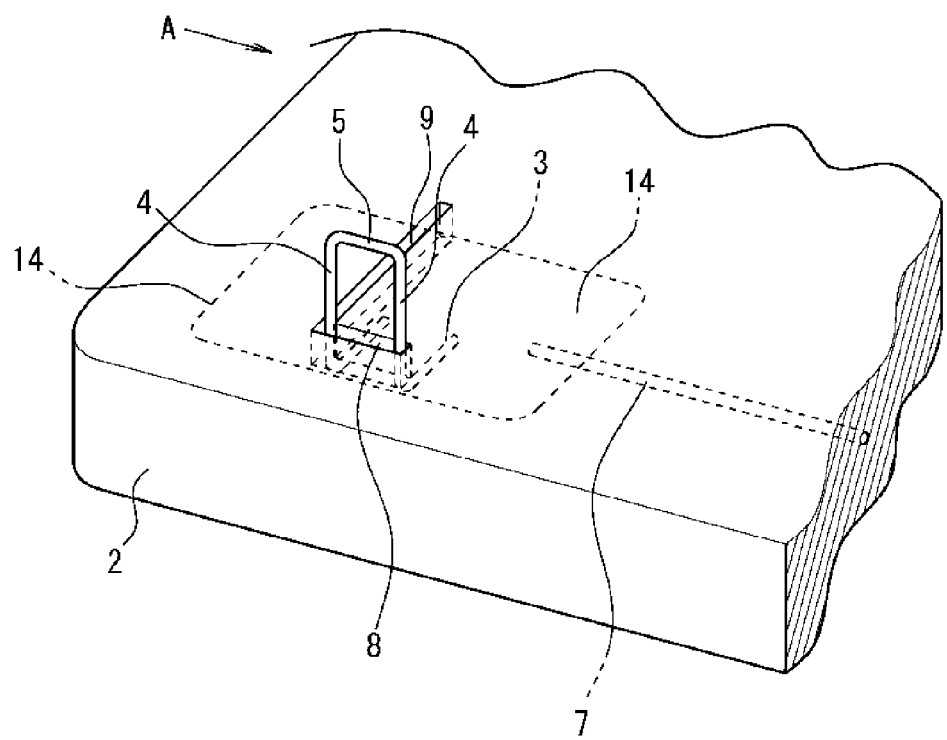
FIG. 3 is an enlarged perspective view schematically illustrating a portion around the securing attachment in the back side of the seat core member after the molded article has shrunk.

According to the present invention as described above, the space or the notch 8 is created in the outer side of the upright frame 4 in the longitudinal direction during or after molding. The space and the notch 8 offer a common effect of providing an escape room for the upright frame 4 while the molded article 2 is shrinking inward in the longitudinal direction (as indicated by the arrow A) as illustrated in FIG. 3. While an element of the molded article 2 moves in the direction indicated by the arrow A, either the space or the notch 8 serves as an escape room for the upright frame 4 and prevents the upright frame 4 from abutting the expanded beads. As a result, the portion of the molded article around the upright frame 4 shrinks as uniformly as other portions.

During the process of shrink, the space or the notch moves inward. Thus, when the molded article has completely shrunk, at least some space or notch exists in the inner side of the upright frame 4 as illustrated in FIG. 3.

It can be summarized that the portion of the molded article in the outer side of the upright frame 4 will not abut the upright frame 4 during shrink of the mold, so that the molded article 2 will not apply a load to the upright frame 4 and therefore the securing attachment 6 will not be pushed inward in the longitudinal direction. This allows the molded article to shrink uniformly, minimizing local dimensional changes. From this point of view, it is more preferable to create a space than a notch in the outer side of the upright frame 4 in the longitudinal direction of the seat core member.

The required length of the space or the notch 8 depends on the type of the resin forming the molded article 2, the place where the securing attachment 6 is provided in the molded article 2, and other factors. The length X of the space or the notch 8 (the length of the space or the notch 8 from the upright frame 4 to the outer side in the longitudinal direction), illustrated in FIG. 5 is preferably as long as or above a value (A) calculated by $\alpha \times L$ mm, where $\alpha$ is the shrinkage ratio of the resin forming the molded article and L is the length from the center of the molded article to the upright frame 4. The upper limit of X is about (A+10) mm. More specifically, X is preferably 5 mm to 20 mm, more preferably, 6 mm to 15 mm.

The center of the molded article 2 is where the molded article 2 is divided in halves in the longitudinal direction of the molded article 2. For the vehicle seat core member 1 illustrated in FIG. 1, for example, the center of the molded article 2 is defined to be the center of a line drawn from one end to the other end of the seat core member 1 to pass through the two securing attachments 6. The vehicle seat core member illustrated in FIG. 1 includes two securing attachments 6 near both ends in the front portion. The securing attachments 6 are connected by the connecting member 7 which is embedded in the front portion of the molded article of expanded beads and extends in the longitudinal direction of the seat core member 1.

The space or the notch 8 is provided from the surface of the molded article 2 toward the base 3 of the securing attachment 6, that is, in the depth direction of the core member. The depth Z of the space or the notch 8 is preferably one third or more, preferably, a half or more of the depth from the surface of the molded article 2 to the base 3. In particular, Z is preferably the depth from the surface of the molded article 2 to the base 3. Width Y of the space or the notch 8 is not particularly limited. It is preferable to create the space to prevent the upright frame 4 from abutting the portion of the molded article in the outer side. The width Y (width in the front and rear direction of the seat core member) of the space is preferably 3 mm to 7 mm. More preferably, Y is almost identical to the width (diameter) of the upright frame 4. The space or the notch 8 having such a shape provides high dimensional accuracy and avoids the molded article near the securing attachment 6 from being scraped off more than necessary. This gives the securing attachment 6 further higher durability against, in particular, the pull-force (strength against a pull). The pull-force is the force applied by pulling the securing attachment 6.

The connecting member 7 formed of a wire having a diameter of 2 mm to 8 mm and a tension strength of 200 N/mm$^2$ or higher is easily bent by shrink of the molded article. Even in this case, deformation of the seat core member 1 that would have been caused without the space or the notch 8 can be avoided by the space or the notch 8. In FIG. 2, the space or the notch 8 is created toward the outer side in the longitudinal direction for each of the two upright frames 4. The spaces or the notches 8 each created toward the outer side in the longitudinal direction for each of the two upright frames 4 may be joined to each other.

Figure 6:
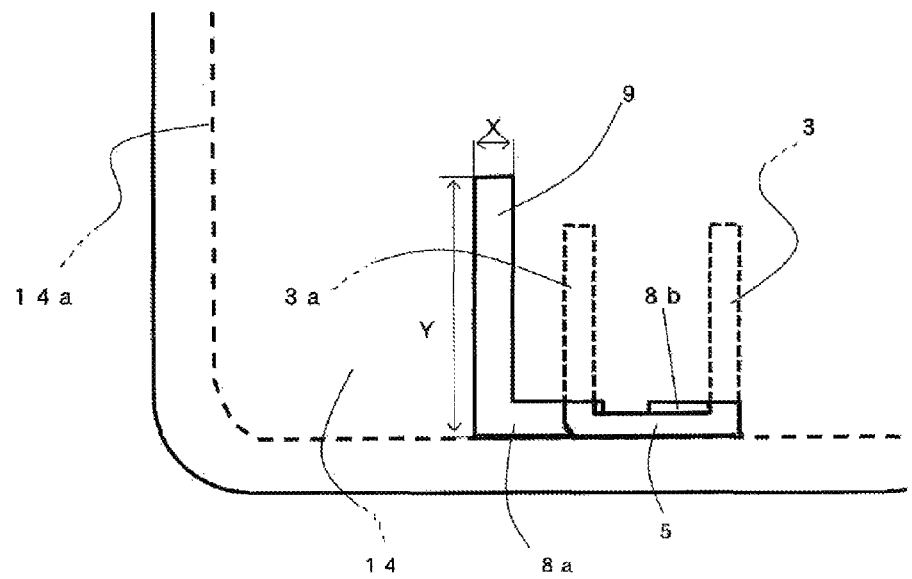
FIG. 6 is a plan view of the back side of the seat core member schematically illustrating a different form of the space or the notch.

Furthermore, in the present invention, it is preferable that a space or a notch 9 as in FIG. 6 is additionally created during or after molding. The space or the notch 9 is created in a portion where the base 3 of the securing attachment 6 and the plate member 14 are embedded. The space or the notch 9 is created in the outer side of the upright frame in the longitudinal direction of the seat core member and extends in a direction intersecting the longitudinal direction of the space or the seat core member. The space or the notch 9 isolates the molded article in the outer side of the space or the notch 9 from the molded article in the inner side. Thus, the molded article near the securing attachment 6 in the inner side of the space or the notch 9 receives smaller effect by shrink of the molded article. This is considered to reduce dimensional errors. In a case where the space or the notch 9 is created as a space illustrated in FIG. 6, it is preferable to create the space 9 in a form of a groove extending in the direction intersecting the longitudinal direction of the seat core member.

Preferably, the space or the notch 9 is separated from the base 3 by a certain distance in the longitudinal direction of the seat core member and intersects the longitudinal direction. Specifically, the space or the notch 9 is created to be separated from the base 3 in the longitudinal direction by a shrink amount (B) of the molded article. Specifically, the distance of separation is preferably about B mm to (B+20) mm. The shrink amount (B) is calculated by α×M, where α is the shrinkage ratio of the resin forming the molded article and M is the distance from the center of the molded article to the base 3. The space or the notch 9 is preferably created in a direction perpendicular to the longitudinal direction of the seat core member.

The space or the notch 9 can be created by molding the molded article of expanded beads using a mold shaped to form the space or the notch 9. Alternatively, the space or the notch 9 can be created, after molding the molded article of expanded beads, by cutting the molded article taken out from a mold using a cutter knife, a heat wire, or other cutting tools. A width (x) of the space or the notch 9 in the longitudinal direction of the seat core member is not particularly limited and may preferably be about 0.1 mm to 20 mm, more preferably, 0.2 mm to 15 mm. The depth of the space or the notch 9 is preferably about one third or more, further preferably, a half or more of the depth of the base 3. More preferably, the space or the notch 9 is created with a depth of about that of the base 3. When the space or the notch 9 is provided as a space, the length y of the space (the length of the space 9 in the direction intersecting the longitudinal direction of the seat core member) is not particularly limited and is preferably about the length of the base 3 or longer. It is preferable to provide two spaces or two notches 9 at least in the outer side of the respective two bases 3.

The space or the notch 9 is preferably joined to the space or the notch 8. With the space or the notch 9 joined to the space or the notch 8, the effect of shrink of the molded article in the outer side of the space or the notch 9 is effectively isolated. By creating the space or the notch 9 with a certain distance from the base 3, no notch exists around the securing attachment 6 except for the notch around the upright frame 4. Thus, a seat core member having high strength against a pull-force can be provided.

It is preferable that the plate member 14 constitutes an end of the connecting member 7 and the base 3 is connected to the plate member 14. Furthermore, it is preferable that the space or the notch 9 is as deep as to reach the plate member 14 and the molded article of expanded beads in the inner side is isolated from the molded article of expanded beads in the outer side. With the plate member 14 provided, the molded article of expanded beads can easily slide against the plate member 14, which reduces the effect of the base 3 abutting the molded article. This is considered to further reduce the effect by the shrink of the molded article.

Figure 7:
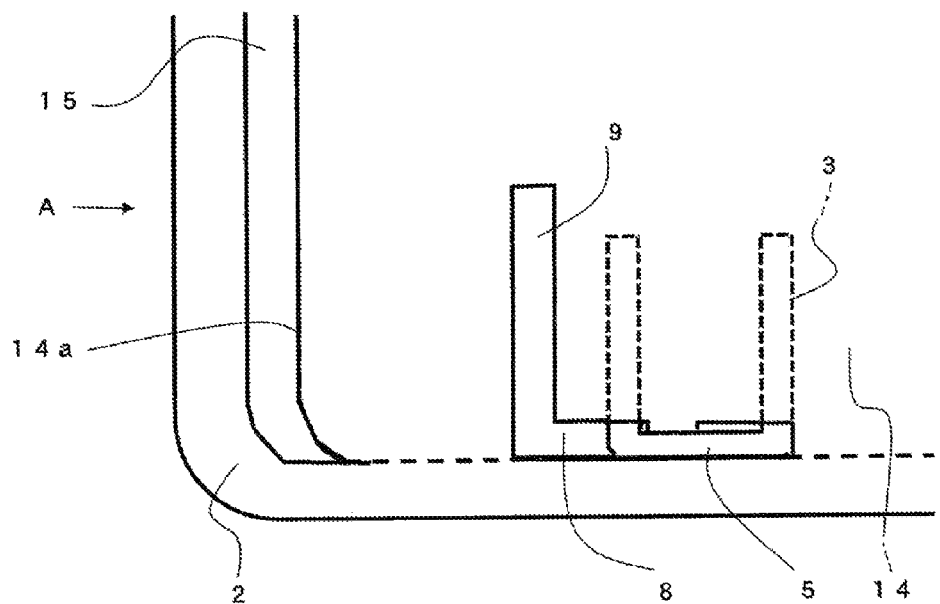
FIG. 7 is a plan view of the back side of the seat core member schematically illustrating the space or the notch with an additional space created.

If the plate member 14 constitutes an end of the connecting member 7, it is preferable to provide a space 15 as illustrated in FIG. 7. The space 15 is created in a portion of the molded article of expanded beads where the plate member 14 is embedded. The space 15 is created in the further outer side of the outer edge of the plate member 14 in the longitudinal direction of the seat core member and extends in a direction intersecting the longitudinal direction of the molded article. While the molded article 2 shrinks inward in the longitudinal direction (the direction indicated by the arrow A), the space 15 prevents the plate member 14 from abutting the molded article 2 (serves as an escape room). This prevents the portion of the molded article 2 in the outer side of the plate member 14 in the longitudinal direction from abutting the edge 14a of the plate member 14. The dimensional error of the molded article 2 is further minimized.

Figure 8:
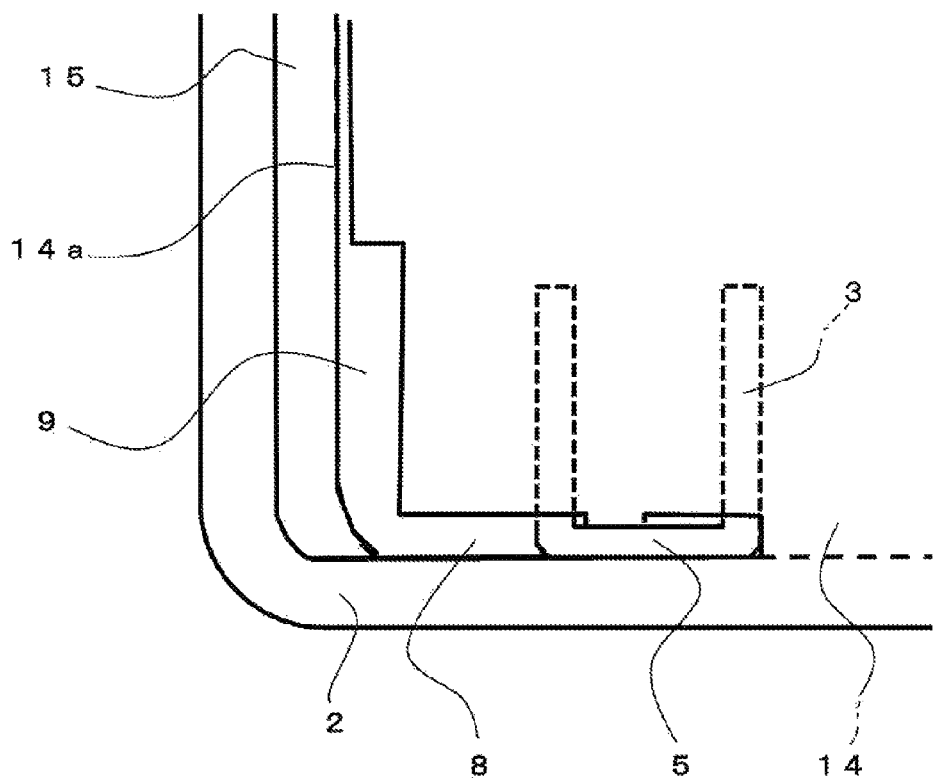
FIG. 8 is a plan view of the back side of the seat core member schematically illustrating another different form of the space or the notch with an additional space created (second embodiment).

The space or the notch 9 created in the direction intersecting the longitudinal direction of the seat core member and the space 15 may be created independent from each other. Alternatively, as illustrated in FIG. 8, the space or the notch 9 and the space 15 may be joined.

Figure 4:
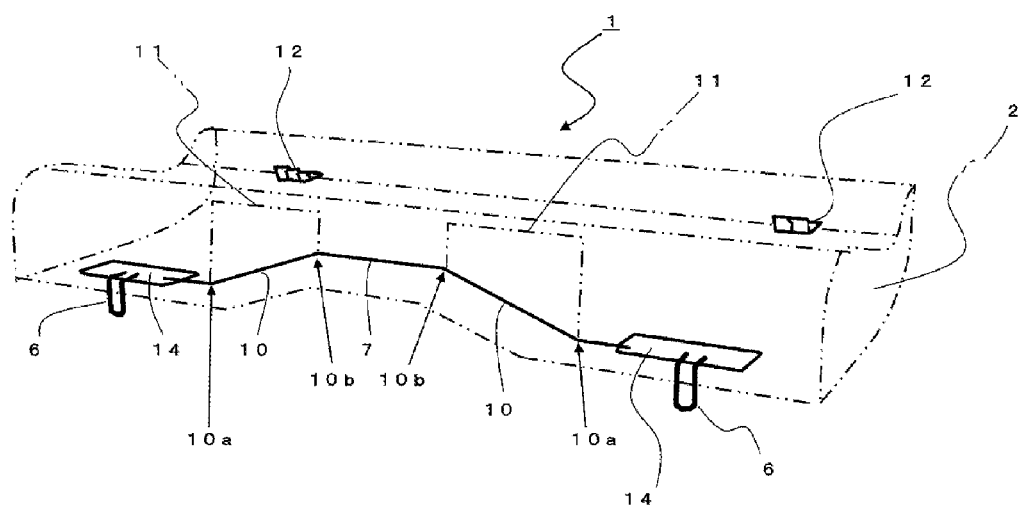
FIG. 4 is a simplified perspective view illustrating another embodiment of the vehicle seat core member.

FIG. 4 illustrates another different embodiment of the vehicle seat core member 1. The seat core member 1 includes a connecting member 7 that connects securing attachments 6 and includes bent sections 10 bent in the thickness direction. For the connecting member 7 including the bent sections 10, void cavities 11 extending in the thickness direction from the surface of the molded article 2 to the bent section 10 are each preferably created during or after molding in the outer side of each bent section 10 in the longitudinal direction of the molded article 2. For example, the bent section 10 illustrated in FIG. 4 is bent upward from the securing attachment. Since the molded article shrinks inward, the void cavity 11 extending from the surface of the molded article 2 to the bent section 10 is provided above and along the bent section 10. The void cavity 11 is therefore created on the upper face side of the bent section 10. With the void cavity 11 provided, the bent section 10 will not be pushed inward in the longitudinal direction by the shrink of the molded article 2. This avoids deformation of the connecting member 7 and ununiform shrink of the molded article around the bent section 10, and thus a seat core member having further higher dimensional accuracy can be provided. The width (the length in the direction perpendicular to the longitudinal direction of the seat core member) of the void cavity 11 is preferably 3 mm to 7 mm, more preferably, as large as about the width of the connecting member. Thus, the void cavity 11 is preferably created in a form of a groove. The length (the length in the longitudinal direction of the seat core member) of the void cavity 11 is not particularly limited as long as the void cavity 11 is created along the bent section 10. The void cavity 11 is preferably created from an end 10a to another end 10b of the bent section 10.

The vehicle seat core member 1 according to the present invention usually constitutes, together with a cushion material and a covering material, a seat for a vehicle. The cushion material is provided on the upper side of the seat core member, and the seat core member supports the cushion material. The cushion material is covered with the covering material.

EXAMPLES

The present invention will now be described in detail with reference to an example.

Example 1

An iron wire of 800 mm in length, 4.5 mm in diameter, and 500 N/mm$^2$ in tension strength (JIS G3532 SWM-B) with each of its both ends connected to an iron plate member (having a thickness of 1.2 mm, a length of 80 mm, and a width of 170 mm) to which a securing attachment connected was prepared. These parts were positioned in a mold for molding a vehicle seat core member (having a longitudinal length of 1230 mm, a length in the front and rear direction of 560 mm, and the maximum thickness of 200 mm (the thickness at the front end is 90 mm)) so as the securing attachments to be embedded near both ends in the front portion of the seat core member. Polypropylene expanded beads (having a apparent density of 0.024 g/cm$^3$) were loaded in the mold, and by steam heating, the seat core member having a shape illustrated in FIG. 1 was molded. The iron parts were integrally embedded in the molded article of expanded beads by molding. As for the steam heating, steam was supplied into the mold for five seconds with drain valves on both sides of the mold opened to perform pre-heating (exhaust step). Heating was performed from one side with a steam pressure of 0.22 MPa(G), which is lower than the steam pressure during molding (0.3 Mpa (G)) by 0.08 MPa(G), and from the opposite side with a steam pressure of 0.26 MPa(G), which is lower than the steam pressure during molding by 0.04 MPa (G). Then, main heating was performed from both sides with a steam of 0.3 MPa(G) to perform molding. After the heating, pressure was released and the molded article was air cooled for 30 seconds and water cooled for 240 seconds. In this manner, the seat core member was obtained. The density of the molded seat core member was 0.03 g/cm$^3$. The securing attachments were disposed near both ends in the front portion of the seat core member, positioned 500 mm from the center in the longitudinal direction. The securing attachment is composed of a base, upright frames, and a securing portion.

Fifteen minutes after molding, a space 8a that extends in the longitudinal direction (having length X (in the longitudinal direction of the seat core member), width Y (in the front and rear direction of the seat core member), and depth Z (in the thickness direction of the seat core member)) extending from an outer upright frame 4a of the securing attachment toward the outer side along the longitudinal direction of the seat core member was created using a cutter knife as illustrated in FIG. 5. In a similar manner, a space 8b (length X, width Y, and depth Z as shown in Table 1) was created for an inner upright frame 4b. The required length X of the space 8a for the outer upright frame was determined to be 10 mm. This was calculated by 500×20/1000 since the shrinkage ratio of polypropylene resin is 20/1000 and the location (distance from the center) of the upright frame of the securing attachment is 500 mm.

The seat core member was cured 12 hours under the atmosphere of 60° C. and then gradually cooled. The dimensional difference of the seat core member and the pulled-distance (pull-force) of the securing attachment were measured. The result is shown in Table 1.

Example 2

A seat core member was molded in a manner similar to the example 1. Spaces 9 and 15 and spaces 8a and 8b, similar to those of the example 1, were created using a cutter knife. The spaces 9 and 15 (having length x in the longitudinal direction of the seat core member, length y in the direction intersecting the longitudinal direction of the seat core member, and depth z shown in Table 1, where y is longer than the example 1 because the space or the notch 9 is joined to the space 15) perpendicular to the longitudinal direction of the seat core member 1 were created using a cutter knife at a location 10 mm to the outer side in the longitudinal direction of the core member from an outer edge 3a of the base 3 located in a longitudinal outer region of the core member (see FIG. 8). The required distance is determined to be 10 mm by calculating 500×20/1000 since the shrinkage ratio of polypropylene resin is 20/1000 and the location (distance from the center) of the base of the securing attachment is 500 mm.

TABLE 1

| | | | EXAMPLE 1 | EXAMPLE 2 | COMPARATIVE EXAMPLE 1 | COMPARATIVE EXAMPLE 2 |
|---|---|---|---|---|---|---|
| OUTER UPRIGHT FRAME | SPACE OR NOTCH IN LONGITUDINAL DIRECTION | LENGTH: X (mm) LONGITUDINAL DIRECTION OF SEAT CORE MEMBER | 10 | 10 | — | |
| | | WIDTH: Y (mm) FRONT AND REAR DIRECTION OF SEAT CORE MEMBER | 5 | 5 | — | —*1 |
| | | DEPTH: Z (mm) | 30 | 30 | — | —*1 |

TABLE 1-continued

| | | | EXAMPLE 1 | EXAMPLE 2 | COMPARATIVE EXAMPLE 1 | COMPARATIVE EXAMPLE 2 |
|---|---|---|---|---|---|---|
| | SPACE OR NOTCH IN DIRECTION INTERSECTING LONGITUDINAL DIRECTION | THICKNESS DIRECTIN OF SEAT CORE MEMBER LENGTH. x (mm) FRONT AND REAR DIRECTION OF SEAT CORE MEMBER | — | 10 | — | —*1 |
| | | LENGTH: y (mm) LONGITUDINAL DIRECTION OF SEAT CORE MEMBER | — | 30 | — | —*1 |
| | | DEPTH: z (mm) THICKNESS DIRECTIN OF SEAT CORE MEMBER | — | 30 | — | —*1 |
| | | DISTANCE (mm) | — | 10 | — | —*1 |
| INNER UPRIGHT FRAME | SPACE OR NOTCH IN LONGITUDINAL DIRECTION | LENGTH: X (mm) LONGITUDINAL DIRECTION OF SEAT CORE MEMBER | 10 | 10 | — | —*1 |
| | | WIDTH: Y (mm) FRONT AND REAR DIRECTION OF SEAT CORE MEMBER | 5 | 5 | — | —*1 |
| | | DEPTH: Z (mm) THICKNESS DIRECTIN OF SEAT CORE MEMBER | 30 | 30 | — | —*1 |
| SEAT MEMBER | DIMENSIONAL DIFFERENCE (mm) | POINT A | +7.4 | +3.8 | +8.1 | +2.4 |
| | | POINT B | +5.5 | +2.5 | +4.9 | +1.7 |
| | | POINT C | +4.4 | +2.4 | +5.6 | +0.6 |
| | | EVALUTION | beter | good | bad | good |
| | PULLED DISTANCE (mm) | 20N | 1 | 1.5 | 0.5 | 2.5 |
| | | 40N | 3 | 2.5 | 2 | 4.5 |
| | | 60N | 4 | 4 | 3.5 | 7 |
| | | 100N | 7 | 8 | 5.5 | 12 |

*1 A notch was created 42 cm² around a securing attachment

Comparative Example 1

A seat core member molded in a manner similar to the example 1 was cured 24 hours under the atmosphere of 60° C. without any space or notch created after molding. Deformation of the seat core member and the pulled-distance of the securing attachment after curing were measured. The result is shown in Table 1. The comparative example 1 showed large dimensional changes and thus cannot satisfy the initial object.

Comparative Example 2

A seat core member molded in a manner similar to the example 1 was cut, after molding, 42 cm² with a depth of 30 mm around a securing attachment to create a cutout. Deformation of the seat core member and the pulled-distance of the securing attachment after curing were measured. The comparative example 2 showed small dimensional changes but small pulled-distances which indicate low durability.

Measurement of Dimensional Difference of Seat Core Member

Figure 9:
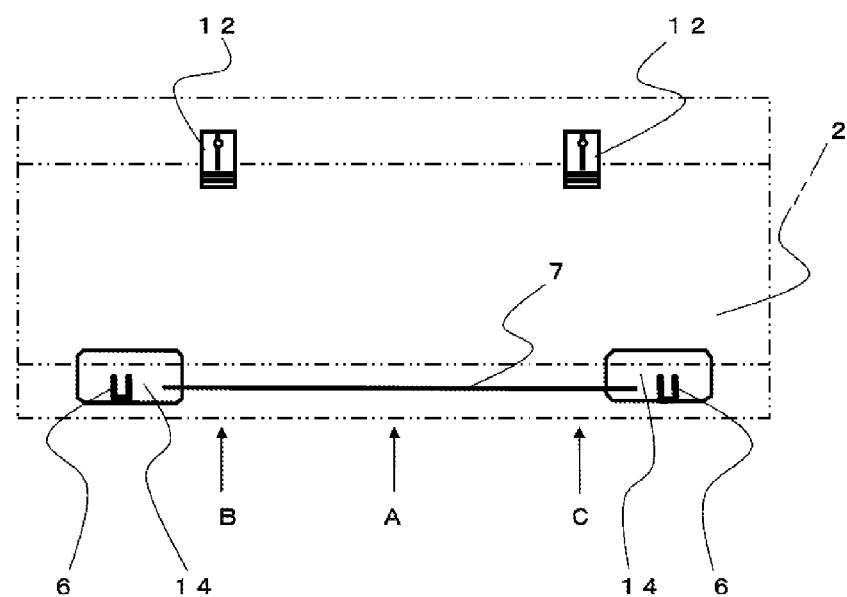
FIG. 9 illustrates points for measuring the change in dimensions of the seat core member.

Dimensional differences between the mold and the cured molded article were measured at point A (the center in the longitudinal direction), point B (340 mm to the left from the center), and point C (340 mm to the right from the center) on the front face of the seat core member illustrated in FIG. 9. The dimensional differences were measured at 20 mm from the bottom face for every point. The plus value indicates that the dimension has shifted to the outer side than the mold, and the minus value indicates that the dimension has shifted to the inner side than the mold. The result was evaluated according to the standard listed below.

good: the average of dimensional differences smaller than 5 mm better: the average of dimensional differences from 5 mm to 6 mm bad: the average of dimensional differences larger than 6 mm Measurement of Pulled-Distance (Pull-Force) of Securing Attachment A push-pull gage (MODEL-9500, a product of AIKOH Engineering Co., Ltd.) was connected to the securing portion 5 embedded in the seat core member, and the securing attachment was pulled with a tension strength shown in Table 1 in a direction 45 degree to the bottom face of the seat core member. The displaced distance of the securing attachment (vertically moved distance) was measured as the pulled-distance. The seat core member showing a smaller pulled-distance has higher strength to resist against a higher pull-force.

REFERENCE SIGNS LIST 1 vehicle seat core member
2 molded article of expanded beads made of thermoplastic resin
3 base
4 upright frame
5 securing portion
6 securing attachment
7 connecting member
8 space or notch
9 space or notch
14 plate member
15 space

The invention claimed is:
1. A method for manufacturing by integral molding a vehicle seat core member including securing attachments used for securing a seat to a vehicle and embedded in a molded article of expanded beads made of thermoplastic resin, the securing attachments being disposed near both ends in a front portion of the vehicle seat core member and connected by a connecting member embedded in a front portion of the molded article of expanded beads, the connecting member extending in a longitudinal direction of the seat core member, each of the securing attachments including a base embedded in the molded article of expanded beads, an upright frame joined to the base to extend out of the molded article of expanded beads, and a securing portion extending from the upright frame to project away from the molded article of expanded beads, the method comprising creating, during or after molding the molded article of expanded beads and before completion of shrinking of the molded article, a space at an outside position from a part of the molded article of expanded beads where the upright frame of the securing attachment is embedded in a longitudinal direction of the seat core member, or a notch at an outside position from the part of the molded article of expanded beads in a longitudinal direction of the seat core member where the upright frame of the securing attachment is embedded toward an outer side in a longitudinal direction of the seat core member.

2. The method for manufacturing a vehicle seat core member according to claim 1, wherein
   a plate member constitutes an end of the connecting member with the base of the securing attachment joined to the plate member, and
   a space or a notch is created to extend in a direction intersecting the longitudinal direction of the seat core member, during or after molding the molded article of expanded beads, at an outside position from a part of the molded article of expanded beads where the plate member and the base are embedded.

3. The method for manufacturing a vehicle seat core member according to claim 1, wherein
   a plate member constitutes an end of the connecting member with the base of the securing attachment joined to the plate member, and
   a space is created, during or after molding the molded article of expanded beads, at an outside position from a part of the molded article of expanded beads where the plate member is embedded and at a further outer portion than an outer edge of the plate member in the longitudinal direction of the seat core member.

4. The method for manufacturing a vehicle seat core member according to claim 1, wherein the space or the notch is created as deep as one third or more of a depth from a surface of the molded article to the base.

5. The method for manufacturing a vehicle seat core member according to claim 1, wherein the connecting member is a wire having a diameter of 2 mm to 8 mm and a tension strength of 200 N/mm$^2$ or higher.

6. The method for manufacturing a vehicle seat core member according to claim 1, wherein a thermoplastic resin forming the molded article of expanded beads includes a crystalline resin.

7. The method for manufacturing a vehicle seat core member according to claim 1, wherein
   the connecting member has a bent section bent in a thickness direction, and
   a void cavity is provided, during or after molding the molded article of expanded beads, at an outside position from the bent section in a part of the molded article of expanded beads where the bent section is embedded, the void cavity extending in a thickness direction from a surface of the molded article of expanded beads to the bent section.

8. A vehicle seat core member integrally molded to embed securing attachments for securing a seat to a vehicle in a molded article of expanded beads made of thermoplastic resin, wherein
   the securing attachments are disposed near both ends in a front portion of the vehicle seat core member and connected by a connecting member embedded in a front portion of the molded article of expanded beads, the connecting member extending in a longitudinal direction of the seat core member,
   each of the securing attachments includes a base embedded in the molded article of expanded beads, an upright frame joined to the base to extend out of the molded article of expanded beads, and a securing portion extending from the upright frame to project away from the molded article of expanded beads, and
   the vehicle seat core member is obtained by creating, during or after molding the molded article of expanded beads and before completion of shrinking of the molded article, a space at an outside position from a part of the molded article of expanded beads where the upright frame of the securing attachment is embedded in a longitudinal direction of the seat core member, or a notch at an outside position from the part of the molded article of expanded beads in a longitudinal direction of the seat core member where the upright frame of the securing attachment is embedded toward an outer side in a longitudinal direction of the seat core member.

* * * * *